UNITED STATES PATENT OFFICE.

SAMUEL S. SADTLER, OF SPRINGFIELD TOWNSHIP, MONTGOMERY COUNTY, PENNSYLVANIA.

PROCESS OF MAKING DICALCIUM PHOSPHATE AND FERTILIZER MATERIAL PRODUCED THEREIN.

1,326,533.     Specification of Letters Patent.     Patented Dec. 30, 1919.

No Drawing.     Application filed March 10, 1919. Serial No. 281,749.

*To all whom it may concern:*

Be it known that I, SAMUEL S. SADTLER, a citizen of the United States, residing at Springfield township, in the county of Montgomery and State of Pennsylvania, have invented certain new and useful Improvements in Processes of Making Dicalcium Phosphate and Fertilizer Material Produced Therein, of which the following is a specification.

This invention relates to the treatment of tricalcium phosphate to produce therefrom a material adapted for use as a fertilizer or fertilizer constituent and has particular reference to a novel process of producing dicalcium phosphate ($CaHPO_4$) from phosphate rock (phosphorite) or other material consisting of or comprising tricalcium phosphate.

It is well known that a material known as superphosphate is produced in enormous quantities by the action of sulfuric acid on ground phosphate rock. It consists of phosphoric acid, monocalcium and dicalcium phosphates, calcium sulfate and impurities coming from the rock. Due to its content of free phosphoric acid and doubtless traces of free sulfuric acids, it rots the bags used as containers if held by them for any great length of time and it has a characteristic phosphate odor. The process which I have invented produces an article useful for agricultural and other purposes but is without free acid. Due to the manner in which it is made, it does not have the strong odor of superphosphate.

In the practice of my process, ground and preferably powdered phosphate rock is subjected at an elevated temperature to the action of sulfur-dioxid gas and steam. To hasten the reaction, the rock is finely comminuted and, in practice, I prefer to grind it sufficiently fine to pass through a 100 mesh screen and to obtain the most economical results, I prefer to employ the sulfur dioxid and steam mixed in approximately equal molecular proportions, although it will be understood that this is by no means essential.

The temperature of the reaction is maintained sufficiently high to prevent the condensation of the steam, that is to say, not materially below 100° C. and, in practice, I prefer to treat the rock under superatmospheric pressure and to maintain the temperature in the reaction chamber at approximately from 140 to 150° C., although this temperature may be widely varied without materially interfering with the progress of the reaction.

I have been unable to establish that a single definite reaction occurs in my process. Owing, as it is believed, to the reversibility of the reactions which occur, sulfuric acid as used in producing superphosphate does not result in a single definite reaction and it could hardly be expected that this would occur in the present process. I have established, however, that the chief product of the reaction is dicalcium phosphate, the principal reaction which occurs being represented by the following equation:

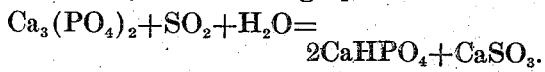

$$Ca_3(PO_4)_2 + SO_2 + H_2O = 2CaHPO_4 + CaSO_3.$$

The product contains not materially in excess of one per cent. and ordinarily slightly less than one per cent. of monocalcium phosphate $CaH_4(PO_4)_2$.

The treatment of the rock is continued as long as absorption takes place, the temperature being maintained throughout the treatment sufficiently high to prevent condensation of steam and the formation of sulfurous acid. When the flow of the gas is shut off, no further heating is necessary to free the product of sulfur dioxid.

After the treatment, as described, the powdered rock looks about as it did before treatment except that it is slightly whitened, although this is barely noticeable. It does not have the strong odor of superphosphate and it does not smell of sulfurous acid, even when heated, notwithstanding that a sulfite is one of the products of the reaction. It is substantially free from free acid and can be kept in bags for long periods without causing them to rot.

By adding air or other source of oxygen with the sulfur dioxid, a part of the calcium sulfite may be converted into sulfate, the principal reaction in this case being as follows:

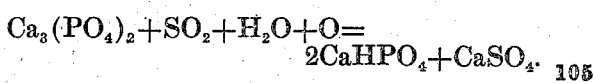

$$Ca_3(PO_4)_2 + SO_2 + H_2O + O = 2CaHPO_4 + CaSO_4.$$

It appears from my experiments that the reaction in my process may be stimulated by the use of gas containing various amounts of oxygen and by the use of catalytic substances, as for example, alkali salts such as sodium bisulfite with the rock.

The following is a specific example of an advantageous manner of practising my process. Flue gases from the roasting of sulfid ores containing essentially sulfur dioxid, nitrogen and steam (which may result from the cooling of the flue gases with air) or these gases and unacted upon air or added oxygen are caused to pass over powdered phosphate rock which may advantageously be held in a heated revolving drum, separate batches being treated as described or the operation carried out as a continuous process and the treatment continued as long as absorption occurs.

The product which contains a substantial amount, usually not materially less than fifteen per cent. by weight, and ordinarily fully fifteen per cent. by weight of citrate soluble dicalcium phosphate with not materially in excess of and ordinarily slightly less than one per cent. of monocalcium phosphate, together with a water insoluble calcium salt is adapted for use as or as an ingredient of fertilizers, or the dicalcium phosphate may be separated from the product by any desired method, for separate use.

While for the purpose of illustration, I have described in detail the preferred practice of my process, it is to be understood that the details of procedure and proportions may be widely varied and that known chemical equivalents of the materials used may be employed without departing from the spirit of my invention or the scope of the subjoined claims.

Having described my invention, I claim:

1. The herein described process which consists in subjecting comminuted prosphate rock to the action of sulfur dioxid and steam at a temperature not materially below nor greatly above 100° C.

2. The herein described process which consists in subjecting comminuted phosphate rock to the action of sulfur dioxid and steam under superatmospheric pressure and at a temperature above but not greatly above 100° C.

3. The herein described process which consists in subjecting comminuted phosphate rock to the action of sulfur dioxid and steam under superatmospheric pressure and at a temperature above 100° C. but not materially above 150° C.

4. The herein described process of subjecting phosphate rock to the action of sulfur dioxid and steam at a temperature of approximately from 140 to 150° C.

5. The herein described product derived from phosphate rock, such product containing dicalcium phosphate, monocalcium phosphate and calcium sulfite, the product being substantially free from free acid.

6. The herein described product derived from phosphate rock, such product containing dicalcium phosphate, monocalcium phosphate and an insoluble calcium salt, the dicalcium phosphate being present in not materially less than fifteen per cent. by weight and the monocalcium phosphate being present in not materially in excess of one per cent. by weight.

7. The herein described product derived from phosphate rock, such product containing dicalcium phosphate, monocalcium phosphate and an insoluble calcium salt, the dicalcium phosphate being present in not materially less than fifteen per cent. by weight and the monocalcium phosphate being present in not materially in excess of one per cent. by weight, the product being substantially free from free acid and without the strong odor of superphosphate.

8. The herein described product derived from phosphate rock, such product containing dicalcium phosphate, monocalcium phosphate and an insoluble calcium salt, the dicalcium phosphate being present in approximately fifteen per cent. by weight and the monocalcium phosphate being present in approximately one per cent. by weight, such product being slightly lighter in color than phosphate rock and being substantially free from free acid and without the strong odor of superphosphate.

In witness whereof I affix my signature in presence of two witnesses.

SAMUEL S. SADTLER.

HARRY A. GREAR,
MARIE O'BRIEN.